(12) United States Patent
Henry et al.

(10) Patent No.: US 12,369,179 B2
(45) Date of Patent: Jul. 22, 2025

(54) METHOD FOR APPLICATION CONTROL AND ADAPTIVE QUALITY OF SERVICE (QOS) HANDLING

(71) Applicant: Cisco Technology, Inc., San Jose, CA (US)

(72) Inventors: Jerome Henry, Pittsboro, NC (US); Robert E. Barton, Richmond (CA); Thomas Szigeti, Vancouver (CA)

(73) Assignee: Cisco Technology, Inc.

( * ) Notice: Subject to any disclaimer, the term of this patent is extended or adjusted under 35 U.S.C. 154(b) by 452 days.

(21) Appl. No.: 17/858,662

(22) Filed: Jul. 6, 2022

(65) Prior Publication Data

US 2024/0015779 A1 Jan. 11, 2024

(51) Int. Cl.
*H04W 72/54* (2023.01)
*H04W 28/02* (2009.01)
*H04W 72/543* (2023.01)
*H04W 84/12* (2009.01)

(52) U.S. Cl.
CPC ..... *H04W 72/543* (2023.01); *H04W 28/0268* (2013.01); *H04W 84/12* (2013.01)

(58) Field of Classification Search
CPC ............. H04W 72/542; H04W 28/0268; H04W 28/18
See application file for complete search history.

(56) References Cited

U.S. PATENT DOCUMENTS

| | | | |
|---|---|---|---|
| 2012/0079111 A1* | 3/2012 | Luukkala | H04L 67/141 |
| | | | 709/227 |
| 2015/0350918 A1 | 12/2015 | Rashid et al. | |
| 2017/0265210 A1 | 9/2017 | Huang et al. | |
| 2021/0250787 A1* | 8/2021 | Kolding | H04L 47/283 |
| 2022/0132331 A1 | 4/2022 | Dakshinkar et al. | |
| 2023/0180047 A1* | 6/2023 | Ajami | H04W 52/0216 |
| | | | 370/230 |

FOREIGN PATENT DOCUMENTS

| | | | | |
|---|---|---|---|---|
| EP | 1916801 A1 | | 4/2008 | |
| WO | WO-2023078560 A1 * | | 5/2023 | ........ H04W 72/543 |

OTHER PUBLICATIONS

Qaimkhani, Irshad Ali, "QoS Enhancements in IEEE 802.11 Wireless LANS to Support Real-Time Services", The University of Manitoba, 2007 (125 pags).

* cited by examiner

*Primary Examiner* — Shukri Taha
(74) *Attorney, Agent, or Firm* — Merchant & Gould P.C.

(57) ABSTRACT

Method for application control and Quality of Service (QoS) handling may be provided. A request may be received for scheduling a communication between an Access Point (AP) and a user device for sending data of an application. It may be determined that the request does not comprise network characteristics of the application. In response to determining that the request does not comprise the network characteristics of the application, the network characteristics may be requested from a Wireless Local Area Network (WLAN) controller. The network characteristics may be received from the WLAN controller. Schedules for the application may be determined based on the network characteristics. The schedules may be enabled.

18 Claims, 4 Drawing Sheets

METHOD FOR APPLICATION CONTROL AND ADAPTIVE QUALITY OF SERVICE (QOS) HANDLING

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, that is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A method for providing application control and adaptive Quality of Service (QoS) handling may be provided. A request for scheduling a communication between an Access Point (AP) and a user device for sending data of an application may be received. AP may determine that the request does not comprise network characteristics of the application. In response to determining that the request does not comprise the network characteristics of the application, the network characteristics may be requested from a Wireless Local Area Network (WLAN) controller. The network characteristics may be received from the WLAN controller. Schedules for the application may be determined based on the network characteristics. The schedules may be enabled.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Quality of Service (QoS) for Wireless Fidelity (Wi-Fi) may have become more complex with development of Internet of Things (IoT) and Augmented Reality/Virtual Reality (AR/VR) applications that may be time sensitive. The Institute of Electrical and Electronics Engineers (IEEE) 802.11e standard may allow applications to access a wireless medium based on priority labels and stacks. However, providing a better statistical access to the wireless medium may not be enough as a time sensitive application may have rigid performance metrics that may not to be met.

The IEEE 802.11be standard may allow a user device to express performance requirements (e.g., a data rate, packet intervals, a maximum delay etc.) for an application. However, although the performance requirements may be known to an application developer, the application developer may not know network interface specifications (i.e., a packet block size, retry rates and logic, etc.). The application developer, for example, may often not know a hardware platform the application may run on. Similarly, a network interface on user device may not know the performance requirements of each application running on the user device. For this type of mismatch, enabling the application developer to provide the performance requirements may be beneficial as the application developer may specify the performance requirements of the application regardless of the hardware platform. However, the application developer may not be able to provide network interface specifications for the application. Merely receiving the performance requirement of an application may not be helpful unless the network interface implements an engine to characterize each application's network behavior.

While characterization may be implemented for known applications, many unknown or lesser-known applications may remain un-characterized and may not be able to provide network characteristics that the network interface may need to provide to an AP for determining schedules. Thus, there may be a need for a simpler mechanism for an application to send performance requirements to an AP that may be used by the AP to better support the application. The embodiments of the disclosure may provide such processes. For example, embodiments of the disclosure may augment the IEEE 802.11be standard by allowing a user device to insert, into its request to the AP, a performance descriptive element. The performance descriptive element may be accessible to and configurable by an application developer. The performance descriptive element may be configured irrespective of a hardware platform and may be used for performance characterization of an application and for the AP to schedule data flow from the application.

Figure 1:
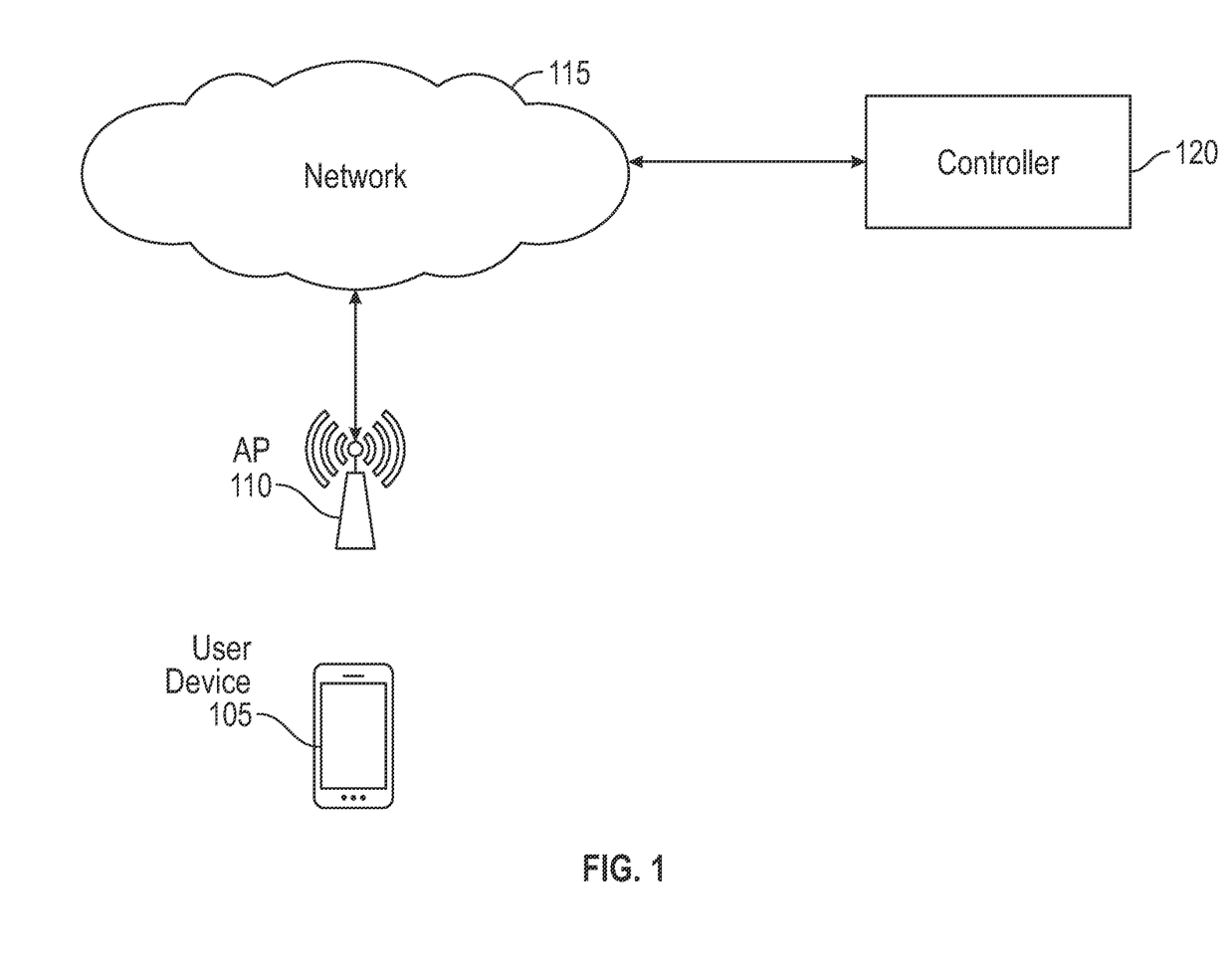
FIG. 1 is a block diagram of an operating environment for providing application control and adaptive Quality of Service (QoS) handling.

FIG. 1 shows an operating environment 100 for providing an application control and adaptive QoS handling. As shown in FIG. 1, operating environment 100 may comprise a user device 105, an AP 110, a network 115, and a controller 120. However, operating environment 100 is not so limited and may include multiple APs and multiple user devices. AP 110 may be associated with one or more user devices, including user device 105. AP 110 may provide an access to network 115 (e.g., a Wireless Local Area Network (WLAN)) to user device 105.

AP 110 may be configured to use Long Term Evolution (LTE), Wi-Fi, Worldwide Interoperability for Microwave Access (WiMAX), Global System for Mobile (GSM) Communications, Code Division Multiple Access (CDMA), Wideband Code Division Multiple Access (WCDMA), etc. Similarly, user device 105 may be connectable to a cellular network that may communicate directly and wirelessly with other devices (e.g., eNodeBs (eNBs) or gNodeBs (gNBs)) to provide access to network 115 (e.g., Internet access). A cellular network may comprise, but is not limited to, an LTE broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

User device 105 may comprise, but is not limited to, an AP, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

Controller 120 may comprise a WLAN controller and may provision and control operating environment 100 (e.g., the WLAN). Controller 120 may allow the plurality of user devices to join operating environment 100. In some embodiments of the disclosure, controller 120 may be implemented by a Digital Network Architecture Center (DNAC) controller (i.e., a Software-Defined Network (SDN) controller) that may configure information for operating environment 100 in order to provide a method for application control and QoS handling consistent with embodiments of the disclosure.

The elements described above of operating environment 100 (e.g., user device 105, AP 110, and controller 120) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
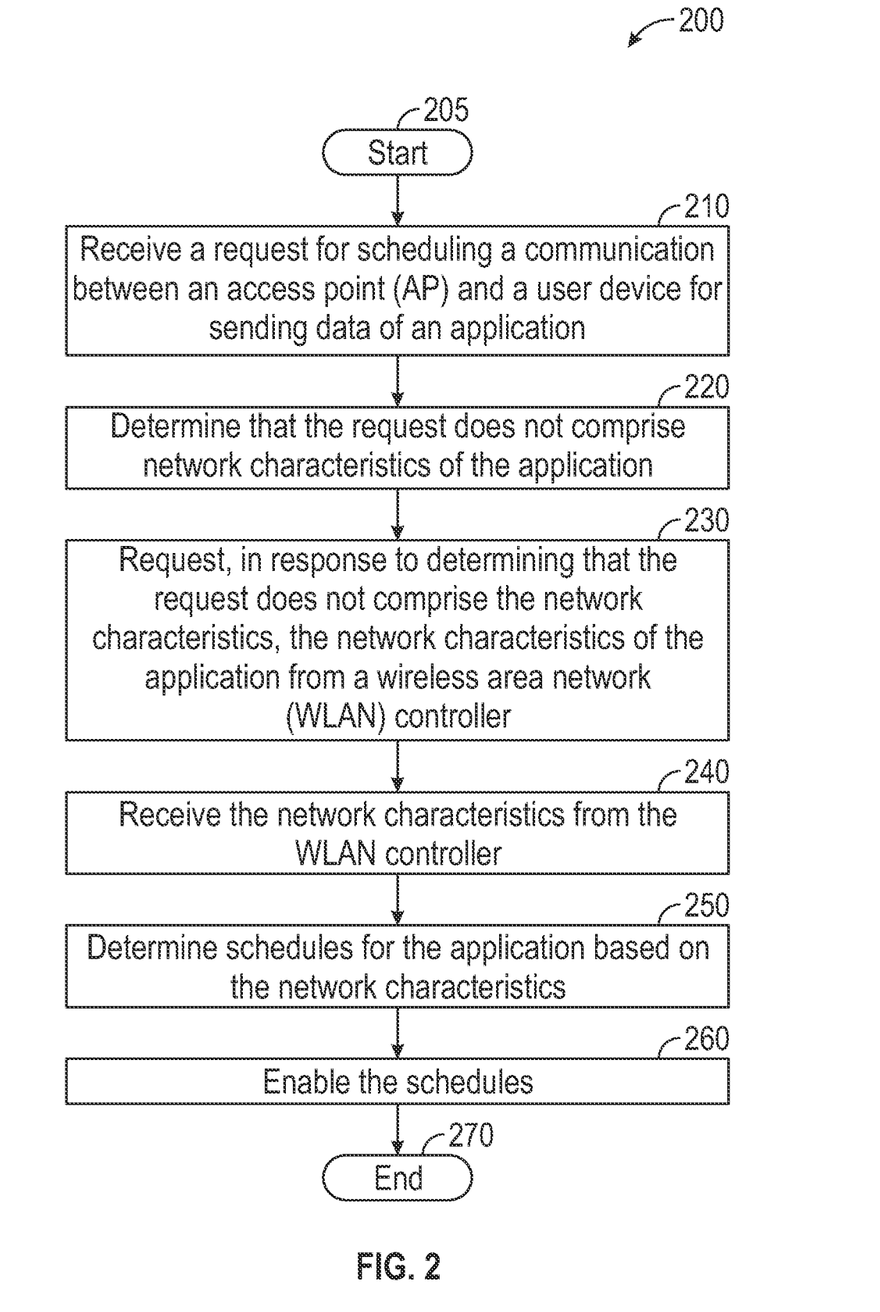
FIG. 2 is a flow chart of a method for providing application control and adaptive Quality of Service (QoS) handling.

FIG. 2 is a flow chart setting forth the general stages involved in a method 200 consistent with an embodiment of the disclosure for providing application control and adaptive QoS handling in a wireless medium. Method 200 may be implemented using AP 110 as described in more detail above with respect to FIG. 1. Ways to implement the stages of method 200 will be described in greater detail below.

Method 200 may begin at starting block 205 and proceeds to stage 210 where AP 110 may receive a request for scheduling a communication between AP 110 and user device 105 for sending data from an application. User device 105, for example, may include an application (e.g., a video conferencing application, an AR/VR application, etc.) that may generate data packets that may correspond to a different type of traffic or flow. The application may generate the data packets that may correspond to audio data traffic, video data traffic, control signals data traffic, software update data traffic, network telemetry data traffic, etc. Some of these data flows may be latency sensitive or time critical. A network interface of user device 105 may send the request, for example, a Stream Classification Service (SCS) request to AP 110 for scheduling a communication to send the data from the application. The request may be sent in advance (e.g., before the application may start sending the data) or just in time.

Once AP 110 receives the request for scheduling the communication between AP 110 and user device 105 at stage 210, method 200 may proceed to stage 220 where AP 110 may determine that the request does not comprise network characteristics of the application. For example, an application developer may express the network characteristics of the application in the request when the application developer is aware of it. The network characteristics may include performance requirements, for example, a data rate, packet intervals, a maximum delay, a maximum jitter, etc.

In some embodiments, the application developer may not be aware of the network characteristics of the application. In such examples, the request may not comprise the network characteristics, but may include a performance descriptive element that may be accessible to the application developer. The application developer, for example, may include the performance descriptive element comprising a category of the application. The application developer may categorize the application into one of a plurality of predetermined categories. The plurality of predetermined categories may comprise, for example, video conferencing, streaming media, transactional data, gaming, etc. A list of the plurality of predetermined categories may be maintained and curated by controller 120 and made available to the application developer.

In accordance with some embodiments of the disclosure, the application developer may not be familiar with the plurality of predetermined categories or may not be sure of a category the application may belong to. In such embodiments, the performance descriptive element may comprise a reference to a known application or a similar known application. The application developer, for example, may indicate the application to be similar to a known application (e.g., a known video conferencing application) from a plurality of known applications. A list of the plurality of known applications may be maintained and curated by controller 120 and made available to the application developer.

In accordance with other embodiments of the disclosure, the performance descriptive element may comprise a QoS Class Identifier (QCI) value. In such embodiments, user device 105 may have a dual connection (i.e., both LTE and Wi-Fi). User device 105 may signal its intent to send data for the application over an LTE bearer. In response, user device 105 may receive a QCI value intended for an uplink LTE transmission from an eNB/gNB of LTE. Instead of sending the data over LTE, user device 105 may send the request to AP 110 with the performance descriptive element comprising the QCI value received from the eNB/gNB of LTE.

Figure 3A:
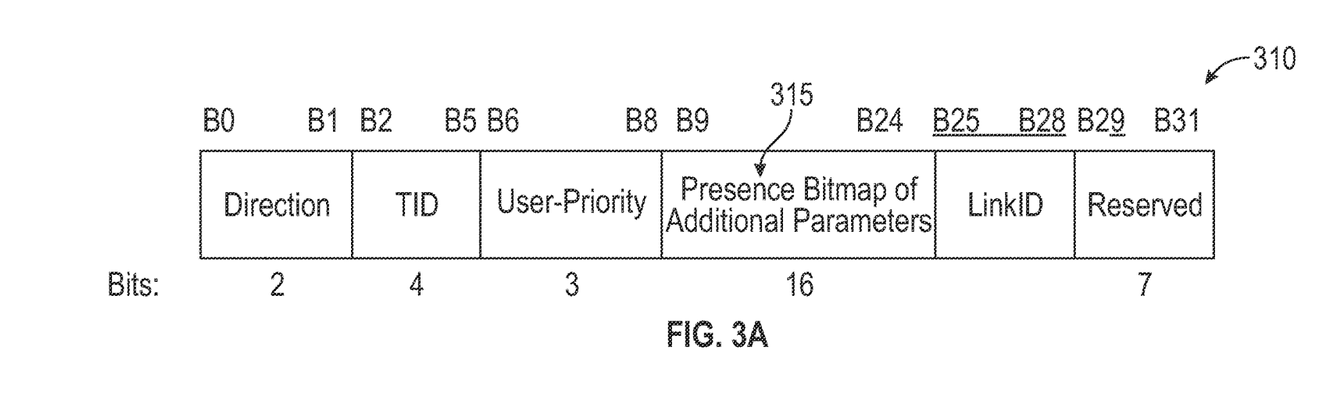
FIG. 3A is diagram illustrating a control information element.

The performance descriptive element may be included in different elements of a request frame (i.e., a SCS request frame). FIG. 3A illustrates a control information element 310 of a SCS request frame for example. The performance descriptive element may be included in a presence bitmap of additional parameters field 315 of control information element 310. Presence bitmap of additional parameters field 315 of control information element 310 may have a length of 16 bits.

Figure 3B:
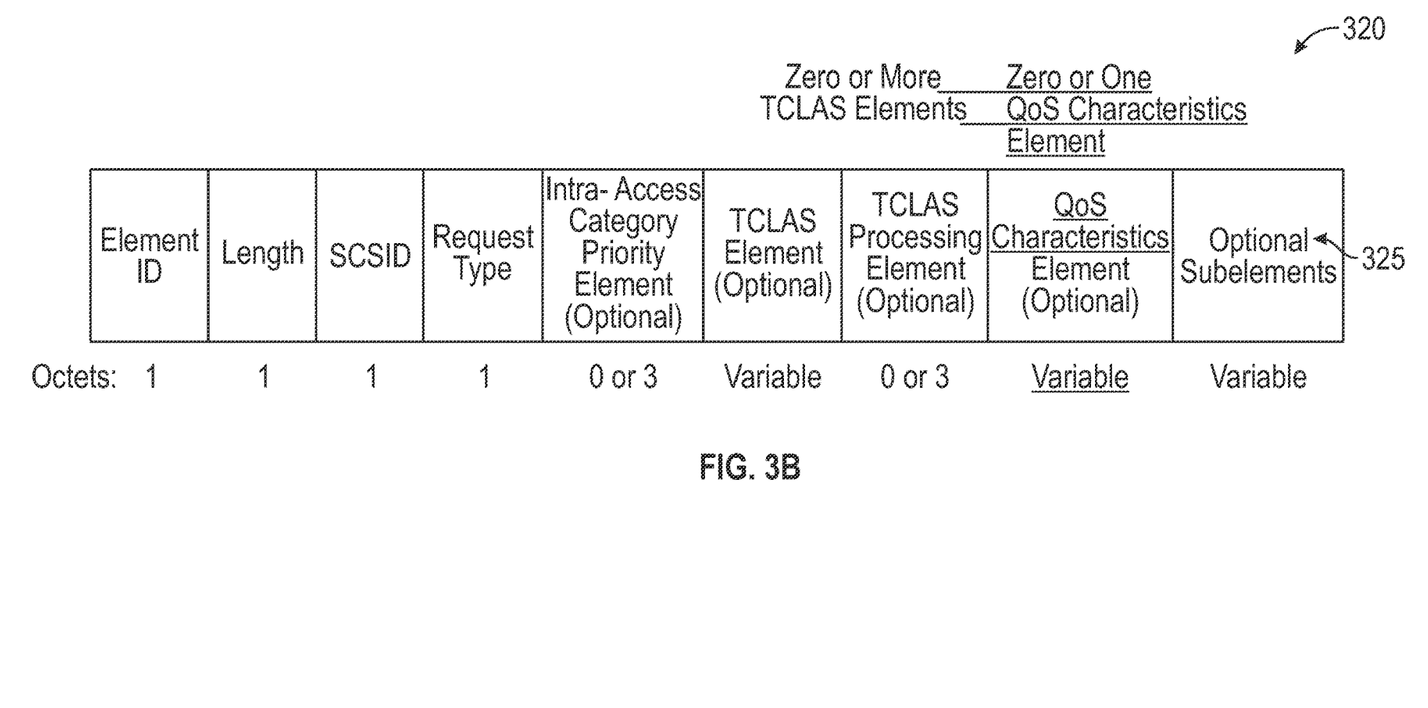
FIG. 3B is diagram illustrating a descriptor element.

FIG. 3B illustrates a descriptor element 320 of a SCS request frame. The performance descriptive element may be included in optional sub-element field 325 of descriptor element 320. Sub-element field 325 of descriptor element 320 may have a variable length. Both, presence bitmap of additional parameters field 315 and optional sub-element field 325 may be placeholder fields in a SCS request frame, and therefore may be used for including the performance descriptive element. However, the performance descriptive element may be included in other fields of each of control information element 310 and descriptor element 320 or a SCS request frame.

From stage 220 where AP 110 determines that the request does not comprise the network characteristics of the application, method 200 may proceed to stage 230 where AP 110 may request, in response to determining that the request does not comprise the network characteristics of the application, the network characteristics of the application from controller 120. For example, AP 110 may determine or extract the performance descriptive element from the request and send a query comprising the performance descriptive element to controller 120. Controller 120 may determine the network characteristics of the application based on the performance descriptive element and provide to AP 110.

Controller 120, for example, may query, when the performance descriptive element comprises an application category, a category database for the network characteristics corresponding to the application category. The category database may comprise a mapping of the plurality of predetermined categories of applications and the network characteristics for each of the plurality of predetermined categories. Controller 120, in another example, may query, when the performance descriptive element comprises a reference to a known application, a known application database for the network characteristics corresponding to the known application. The known application database may comprise a mapping of the plurality of known applications and the network characteristics for each of the plurality of known applications. Controller 120, in yet another example, may query, when the performance descriptive element comprises a QCI value, a database for the network characteristics corresponding to the QCI value.

After AP 110 requests the network characteristics from controller 120 in response to determining that the request does not comprise the network characteristics in stage 230, method 200 may proceed to stage 240 where AP 110 may receive the network characteristics from controller 120. AP 110, for example, may receive the network characteristics of the application from controller 120 or download it from a corresponding database based on the performance descriptive element. In accordance with some embodiments, the application developer may overwrite or customize the received network characteristics. The application developer, for example, may perform a network test and determine the network characteristics of the application based on the network test. The network characteristics, in some examples, determined through the network test may be more accurate than those received from controller 120.

From stage 240 where AP 110 receives the network characteristics of the application from controller 120, method 200 may proceed to stage 250 where AP 110 may determine schedules for the application based on the network characteristics. For example, AP 110 may determine a Bandwidth (BW), a Transmit Opportunity (TXOP), and a duration for transmitting data of the application based on the network characteristics of the application.

After AP 110 determine schedules for the application based on the network characteristics in stage 250, method 200 may proceed to stage 260 where AP 110 may enable the schedules. AP 110, for example, may build a hierarchical scheduler. In this mode, AP 110 may attempt to schedule all applications form all user devices, matching its network characteristics (i.e., the BW, the TXOP, and the duration). Retry bits and Buffer Status Report (BSR) depth may act as a pressure gauge for a traffic flow. Each traffic flow may be labeled with a criticality, a delay, and an error rate budget (e.g., log(delay)+log(loss) \times {business criticality index} \times retries over interval \times BSR depth). Each TXOP may then be scheduled based on a pro-rata of user device 105 and a pressure gauge value. The result of this metric may be that user device 105 with an application with a critical traffic and low tolerance for loss or delay may get scheduled more aggressively than other user devices. As the retry rate or the BSR depth increases, user device 105 may get scheduled with more TXOPs, including beyond its initial requested values, thus ensuring that the critical traffic may get past a target loss or a delay value. Once AP 110 enables the schedules in stage 260, method 200 may then end at stage 270.

As user device 105 moves, Received Signal Strength Indicator (RSSI) values may fluctuate. Therefore, the application's performance metrics may be constantly monitored by AP 110 and values which may lead to better alignment of traffic profile may be adjusted (e.g., the TXOP for user device 105). Over time, a predictor may be created that correlates various input values, such as the RSSI, a Signal to Noise Ratio (SNR), a Channel utilization, etc., with an application performance metrics. As such, this reinforcement learning approach may be used to proactively adjust the TXOP values for user device 105 using a critical application even before performance degrades. In some example embodiments, AP 110 may set an adaptive retry rate for a downstream traffic that may adapt to each flow requirements instead of a default retry rate. Thus, retries may be reduced as the measured delay gets closer to the maximum budget, and may be increased as loss gets closer to a maximum budget, both values arbitrating each other.

In addition to the performance descriptive element, the application developer or a network administrator may express whether the application is business-critical, business-relevant, non-business, or unspecified. Such qualifiers may be part of a configuration task and may be provided to user device 105 as a Mobile Device Management (MDM) profile, a Group Policy Object (GPO), etc. In a hierarchical scheduler, business-critical applications may receive better scheduling than a non-business critical application, for example. The application may also express a maximum Round Trip Time (RTT) delay budget. The RTT delay budget may be end-to end. However, in accordance with some embodiments of the disclosure, the request (e.g., SCS Descriptor element 320) may allow the application to inform AP 110 of a return traffic profile. This may allow AP 110 to measure a delay to that return traffic profile and thus compute a LAN+Internet RTT. Even without this determination, the RTT delay budget may be used as a target envelope to design a delay sensitivity scale between competing upstream traffics sent to AP 110.

The application may further express a packet error and a loss budget (e.g., a percentage of transmitted packets that can be lost without damage to the application performances). The packet error and the loss budget, that may be an upper layer (e.g., a layer 7 (L7)) and an end-to-end value, may be used by AP 110 to derive a local loss budget, both for upstream traffics and downstream traffics. User device 105 may express the packet error and the lost budget that were determined by the application developer and provided in the application package.

Figure 4:
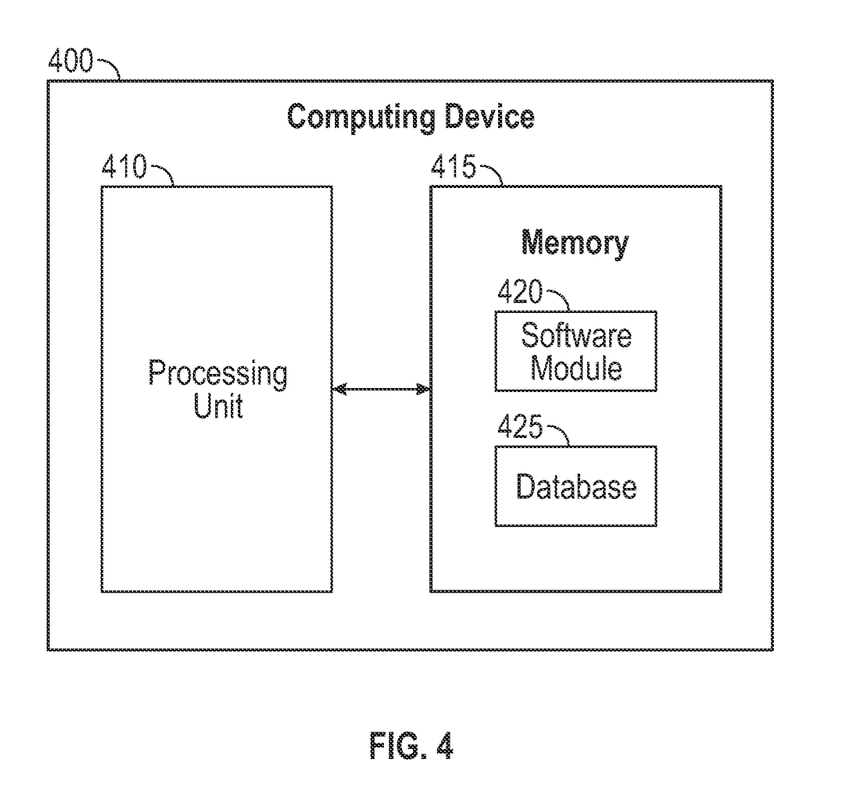
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes providing application control and adaptive QoS handling as described above with respect to FIG. 2. Computing device 400, for example, may provide an operating environment for user device 105, AP 110, and controller 120. User device 105, AP 110, and controller 120 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving a request for scheduling a communication between an Access Point (AP) and a user device for sending data of an application wherein receiving the request for scheduling the communication between the AP and the user device comprises receiving a Quality of Service (QOS) Class Identifier (QCI) value of the application wherein receiving the QCI value comprises receiving the QCI value in response to sending a decision to send data wherein the QCI is included in a performance descriptive element;
determining that the request does not comprise network characteristics of the application;
requesting, in response to determining that the request does not comprise the network characteristics of the application, the network characteristics from a Wireless Local Area Network (WLAN) controller;
receiving the network characteristics from the WLAN controller;
determining schedules for the application based on the network characteristics; and
enabling the schedules.

2. The method of claim 1, wherein receiving the request for scheduling the communication between the AP and the user device comprises receiving the performance descriptive element comprising a category for the application.

3. The method of claim 2, wherein receiving the performance descriptive element comprising the category for the application comprises receiving the performance descriptive element comprising the category for the application in a placeholder field of a Stream Classification Service (SCS) request frame.

4. The method of claim 3, wherein receiving the performance descriptive element comprising the category for the application in the placeholder field of the SCS request frame comprises receiving in a presence bitmap of additional parameters field of a control information element of the SCS request frame.

5. The method of claim 3, wherein receiving the performance descriptive element comprising the category for the application in the placeholder field of the SCS request frame comprises receiving in an optional sub-element field of a descriptor element of the SCS request frame.

6. The method of claim 1, wherein receiving the request for scheduling the communication between the AP and the user device comprises receiving the performance descriptive element comprising a known application that is similar to the application.

7. A system comprising:
a memory storage; and
a processing unit coupled to the memory storage, wherein the processing unit is operative to:
receive a request for scheduling a communication between an Access Point (AP) and a user device for sending data of an application wherein the request for scheduling the communication between the AP and the user device comprises a Quality of Service (QOS) Class Identifier (QCI) value of the application received in response to sending a decision to send data wherein the QCI is included in a performance descriptive element;
determine that the request does not comprise network characteristics of the application;
request, in response to determining that the request does not comprise the network characteristics of the application, the network characteristics from a Wireless Local Area Network (WLAN) controller;
receive the network characteristics from the WLAN controller;
determine schedules for the application based on the network characteristics; and
enabling the schedules.

8. The system of claim 7, wherein the processing unit being operative to receive the request for scheduling the communication between the AP and the user device comprises the processing unit being operative to receive the performance descriptive element comprising one of the following: a category for the application and a known application that is similar to the application.

9. The system of claim 8, wherein the performance descriptive element is received in a placeholder field of a Stream Classification Service (SCS) request frame.

10. The system of claim 9, wherein the placeholder field comprises one of the following: a presence bitmap of additional parameters field of a control information element of the SCS request frame and an optional sub-element field of a descriptor element of the SCS request frame.

11. The system of claim 8, wherein the processing unit is further operative to query a controller using the performance descriptive element to determine the network characteristics of the application.

12. The system of claim 7, wherein the QCI value of the application is received from a cellular network.

13. A non-transitory computer-readable medium that stores a set of instructions which when executed perform a method comprising:
receiving a request for scheduling a communication between an Access Point (AP) and a user device for sending data of an application wherein receiving the request for scheduling the communication between the AP and the user device comprises receiving a Quality of Service (QOS) Class Identifier (QCI) value of the application wherein receiving the QCI value comprises receiving the QCI value in response to sending a decision to send data wherein the QCI is included in a performance descriptive element;
determining that the request does not comprise network characteristics of the application;
requesting, in response to determining that the request does not comprise the network characteristics of the application, the network characteristics from a Wireless Local Area Network (WLAN) controller;
receiving the network characteristics from the WLAN controller;
determining schedules based on the network characteristics; and
enabling the schedules.

14. The non-transitory computer-readable medium of claim 13, wherein receiving the request for scheduling the communication between the AP and the user device comprises receiving the performance descriptive element comprising a category for the application.

15. The non-transitory computer-readable medium of claim 14, wherein receiving the performance descriptive element comprising the category for the application comprises receiving the performance descriptive element comprising the category for the application in a placeholder field of a Stream Classification Service (SCS) request frame.

16. The non-transitory computer-readable medium of claim 15, wherein receiving the performance descriptive element comprising the category for the application in the placeholder field of the SCS request frame comprises receiving in a presence bitmap of additional parameters field of a control information element of the SCS request frame.

17. The non-transitory computer-readable medium of claim 15, wherein receiving the performance descriptive element comprising the category for the application in the placeholder field of the SCS request frame comprises receiving in an optional sub-element field of a descriptor element of the SCS request frame.

18. The non-transitory computer-readable medium of claim 13, wherein receiving the request for scheduling the communication between the AP and the user device comprises receiving the performance descriptive element comprising a known application that is similar to the application.

* * * * *